US00RE49941E

(19) United States
(12) Reissued Patent
Powers

(10) Patent Number: US RE49,941 E
(45) Date of Reissued Patent: Apr. 23, 2024

(54) RATING AN ENHANCED STRENGTH CONDUCTOR

(71) Applicant: Southwire Company, LLC, Carrollton, GA (US)

(72) Inventor: Wilber F. Powers, Newnan, GA (US)

(73) Assignee: Southwire Company, LLC, Carrollton, GA (US)

(21) Appl. No.: 16/719,301

(22) Filed: Dec. 18, 2019

Related U.S. Patent Documents

Reissue of:
(64) Patent No.: 9,847,152
Issued: Dec. 19, 2017
Appl. No.: 13/478,167
Filed: May 23, 2012

U.S. Applications:
(63) Continuation of application No. 12/467,264, filed on May 16, 2009, now abandoned.

(60) Provisional application No. 61/095,408, filed on Sep. 9, 2008.

(51) Int. Cl.
*H01B 5/00* (2006.01)
*H01B 1/02* (2006.01)
*H01B 5/10* (2006.01)

(52) U.S. Cl.
CPC ..... *H01B 1/023* (2013.01); *H01B 5/104* (2013.01)

(58) Field of Classification Search
CPC ..... H01B 7/14; H01B 7/045; H01B 9/006; H01B 13/00; H01B 9/003
See application file for complete search history.

(56) References Cited

U.S. PATENT DOCUMENTS

| | | | |
|---|---|---|---|
| 1,943,087 | A | 1/1934 | Potter et al. |
| 3,164,670 | A | 1/1965 | Ege |
| 3,813,481 | A | 5/1974 | Adams |
| 3,823,542 | A | 7/1974 | Pemberton |
| 4,182,640 | A | 1/1980 | Yokota |
| 5,554,826 | A | 9/1996 | Gentry |

(Continued)

FOREIGN PATENT DOCUMENTS

| | | |
|---|---|---|
| GB | 1469916 | 4/1977 |
| GB | 1479209 | 7/1977 |

(Continued)

OTHER PUBLICATIONS

Southwire Overhead Conductor Manual, Thrash et al., 1994, § 1.2, §1.4.1, §2.1.2, §2.1.6, & §2.2.

(Continued)

*Primary Examiner* — Joseph A Kaufman
(74) *Attorney, Agent, or Firm* — Merchant & Gould P.C.

(57) ABSTRACT

A conductor may be rated. First, a conductor core comprising a first material and having a core elongation may be provided. Next, a plurality of conductor strands may be provided. The plurality of conductor strands may comprise a second material. The elongation of the plurality of conductor strands may be one of greater than the core elongation or equal to the core elongation. Then a rating for a conductor comprising the conductor core and the plurality of conductor strands may be provided. The rating may include a composite rated breaking strength of the conductor being a function of the core elongation and not being limited by the elongation of the plurality of conductor strands.

16 Claims, 1 Drawing Sheet

(56) References Cited

U.S. PATENT DOCUMENTS

| | | | | |
|---|---|---|---|---|
| 5,636,551 | A * | 6/1997 | Davidson et al. | 74/502.5 |
| 6,180,232 | B1 * | 1/2001 | McCullough et al. | 428/379 |
| 6,204,452 | B1 * | 3/2001 | Valadez | H01B 7/0009 174/126.1 |
| 6,559,385 | B1 * | 5/2003 | Johnson et al. | 174/126.1 |
| 7,093,416 | B2 * | 8/2006 | Johnson et al. | 57/212 |
| 7,228,627 | B1 | 6/2007 | Yoshimura et al. | |
| 8,525,033 | B2 * | 9/2013 | Grether | 174/128.1 |
| 8,653,370 | B2 * | 2/2014 | Johnson et al. | 174/108 |
| 2003/0037957 | A1 * | 2/2003 | Ueno | H01B 7/0009 174/128.1 |
| 2010/0059249 | A1 | 3/2010 | Powers | |
| 2012/0163758 | A1 * | 6/2012 | McCullough | H01B 1/02 385/101 |
| 2014/0251653 | A1 * | 9/2014 | Lancaster | H01B 9/006 174/128.1 |
| 2015/0368496 | A1 * | 12/2015 | Hawig | H01B 3/308 174/110 SR |

FOREIGN PATENT DOCUMENTS

| | | | | |
|---|---|---|---|---|
| GB | 1479209 | | 7/1997 | |
| GB | 2435347 | A * | 8/2007 | H01B 7/14 |
| JP | 2004014337 | * | 1/2004 | |
| WO | WO-2011008620 | A2 * | 1/2011 | H01B 7/045 |

OTHER PUBLICATIONS

International Search Report dated Dec. 9, 2009 cited in Application No. PCT/US2009/056309.

* cited by examiner

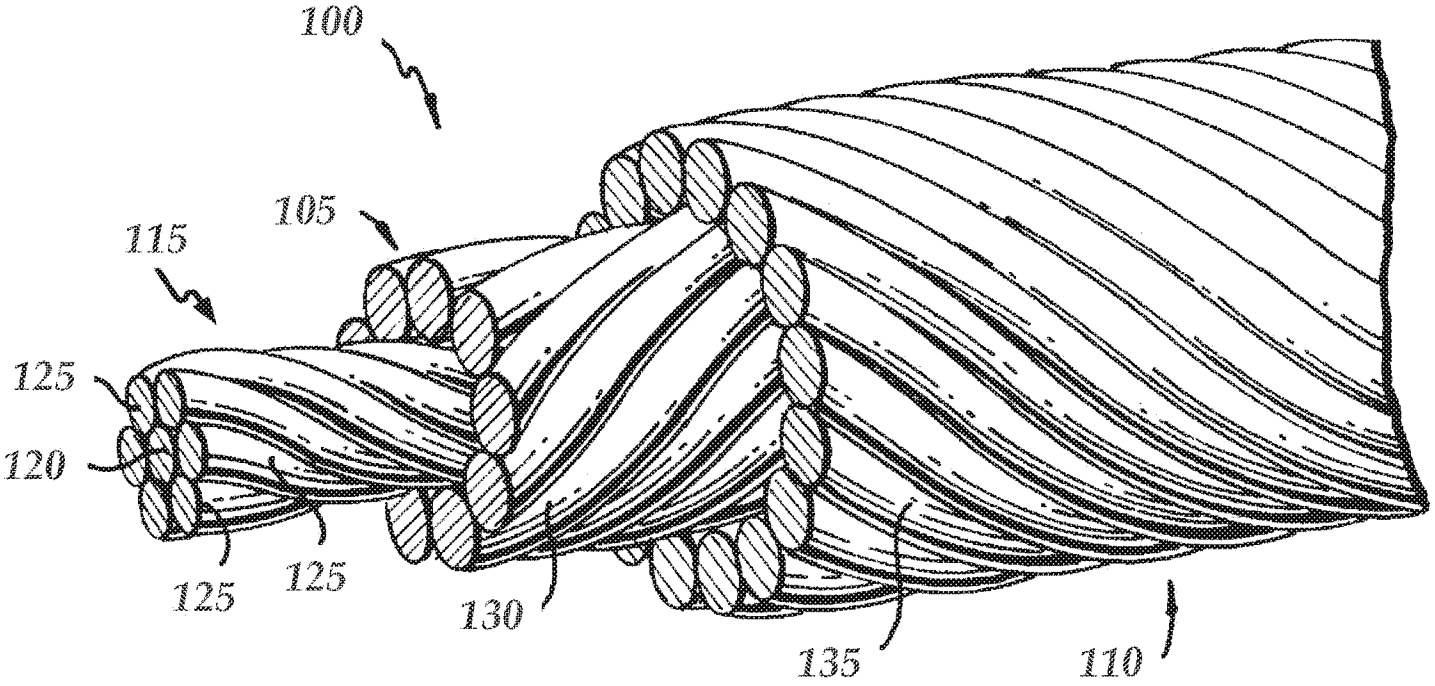
100
105
115
125
125
120
125
130
135
110

RATING AN ENHANCED STRENGTH CONDUCTOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application is *a reissue application of U.S. Pat. No. 9,847,152, which is* a Continuation of [co-pending] U.S. application Ser. No. 12/467,264 entitled "Enhanced Strength Conductor" filed May 16, 2009*, now abandoned*, which claims the benefit under provisions of 35 U.S.C. §119(e) of U.S. Provisional Application No. 61/095,408, filed Sep. 9, 2008, which are incorporated herein by reference.

COPYRIGHTS

All rights, including copyrights, in the material included herein are vested in and the property of the Applicants. The Applicants retain and reserve all rights in the material included herein, and grant permission to reproduce the material only in connection with reproduction of the granted patent and for no other purpose.

BACKGROUND

Aluminum Conductor Steel Reinforced (ACSR) cable is a high-capacity, high-strength stranded power cable used as electrical conductors in overhead power lines. The outer strands in an ACSR cable are aluminum. Aluminum has very good conductivity, low weight, and relatively low cost. The center strands (i.e. core) in an ACSR cable are made of steel, which provides extra strength for the ACSR cable. The lower electrical conductivity of the steel core has only a minimal effect on the overall current-carrying capacity of the cable due to the "skin effect." With the skin effect, most of the current in an ACSR conductor is carried by the aluminum portion of the cable. Consequently, the higher resistance of the steel strands has only a small effect on the cable's overall resistance.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

An electrical conductor may be provided. The electrical conductor may comprise a conductor core comprising a plurality of core strands. Each of the plurality of core strands may comprise a first material. The electrical conductor may further comprise a plurality of conductor strands wrapped around the core. The plurality of conductor strands may comprise a second material. An elongation of the second material may be greater than 1% and may be less than an elongation percentage of the first material or may be equal to the elongation percentage of the first material.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIG. 1 shows an electrical conductor.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

"Concentric-Lay-Stranded Conductor" is a conductor comprising a center core surrounded by one or more layers of helically wound conductor wires. The conductor's "lay" may refer to the length and direction of strands in layers comprising the conductor. The lay length may comprise the axial length of one complete revolution of a helical strand. The lay direction may be defined as right-hand or left-hand, referring to the individual strands' wrap direction as viewed axially in a direction away from an observer. Consistent with embodiments of invention, the conductor may comprise, for example, a homogeneous or a non-homogeneous material. Individual strands comprising the conductor may be, but not limited to, round or trapezoidal-shaped.

FIG. 1 shows an aluminum conductor steel reinforced (ACSR) conductor 100 consistent with embodiments of the invention. ACSR conductor 100 may comprise a high-capacity, high-strength stranded conductor used, for example, in overhead power lines. Conductor 100 may include a first conductor layer 105, a second conductor layer 110, and a core 115. Core 115 may comprise a center strand 120 with outer core strands 125 helical wrapped around center strand 120. Second conductor layer 110 may be helical wrapped around first conductor layer 105. First conductor layer 105 may be helical wrapped around core 115. First conductor layer 105 and second conductor layer 110 may be wrapped in respective alternating hand lay. First conductor layer 105 and a second conductor layer 110 may comprise conductor strands that have a trapezoidal cross-sectional shape. Moreover, first conductor layer 105 and a second conductor layer 110 may comprise conductor strands that are compacted.

First conductor layer 105 may comprise first conductor layer strands 130. Second conductor layer 110 may comprise second conductor layer strands 135. First conductor layer strands 130 and second conductor layer strands 135 may be considered conductor strands. Center strand 120 and outer core strands 125 may be considered core strands. First conductor layer strands 130 and second conductor layer strands 135 may comprise aluminum or an aluminum alloy that may be chosen for aluminum's high conductivity, low weight, and low cost. Outer core strands 125 and center strand 120 may comprise steel (e.g. high strength steel), providing strength to conductor 100. When core 115 is steel, steel's lower electrical conductivity may have a minimal effect on conductor 100's overall current-carrying capacity. This is because, due to the "skin effect", conductor 100's current may be carried mostly by first conductor layer 105 and second conductor layer 110, with core 115 carrying very little current. Because first conductor layer 105 and second conductor layer 110 may comprise relatively low resistance aluminum, core 115's higher resistance may be immaterial. As described in greater detail below, consistent with embodiments of the invention, the conductor strands may be made of a material that may allow conductor 100 to take better advantage of the core strands' strength as compared to conventional ACSR.

A conductor type's rated breaking strength may be an important parameter when evaluating several different conductor types. The National Electric Safety Code (NESC) recommends limits on the tension of bare overhead conductor as a percentage of a conductor's rated breaking strength. Per the NESC, the tension limits are: 60% under maximum ice and wind loading, 35% initial unloaded (when installed) at 60° F., and 25% final unloaded (after maximum loading has occurred) at 60° F. It is common, however, for lower unloaded tension limits to be used. Except in areas experiencing severe ice loading, it is not unusual to find tension limits of 60% maximum, 25% unloaded initial, and 15% unloaded final. This set of specifications could easily result in an actual maximum tension on the order of only 35 to 40%, an initial tension of 20%, and a final unloaded tension level of 15%. In this case, the 15% tension limit is said to govern.

When designing power lines, sag-tension calculations, using exacting equations, are usually performed with the aid of a computer; however, with certain simplifications, these calculations can be made with a handheld calculator. The latter approach allows greater insight into sag and tension calculations than is possible with complex computer programs. Equations suitable for such calculations can be applied to the following example.

Sag and slack may be calculated for a 600-foot level span of 795 kcmil-26/17 ACSR "Drake" conductor. The bare conductor weight per unit length, wb, is 1.094 lbs/ft. The conductor may be installed with a horizontal tension component, H, of 6,300 lbs, equal to 20% of its rated breaking strength of 31,500 lbs.

The sag for this level span is:

$$D = \frac{1.094(600)^2}{(8)6300} = 7.81 \text{ ft } (2.38 \text{ m})$$

The conductor length between the support points is:

$$L = \frac{600 + 8(7.81)^2}{3(600)} = 600.27 \text{ ft } (183.01 \text{ m})$$

Note that the conductor length depends solely on span and sag. It is not directly dependent on conductor tension, weight, or temperature. The conductor slack is the conductor length minus the span length; in this example, it is 0.27 feet (0.0826 m).

Applying calculus to the catenary equation allows the conductor length calculation, L(x), measured along the conductor from the catenary's low point in either direction. The resulting equation becomes:

$$L(x) = \frac{H}{w}\sinh\left(\frac{wx}{H}\right) \approx x\left(1 + \frac{x^2w^2}{6H^2}\right)$$

For a level span, the conductor length corresponding to x=S/2, is half of the total conductor length, L:

$$L = \left(\frac{2H}{w}\right)\sinh\left(\frac{Sw}{2H}\right) \approx S\left(1 + \frac{S^2x^2}{24H^2}\right)$$

The parabolic equation for conductor length can also be expressed as a function of sag, D, by substitution of the sag parabolic equation:

$$L = S + \frac{8D^2}{3S}$$

As demonstrated above, a conductor type's rated breaking strength may be an important parameter when designing a power line. Methods for calculating a stranded conductor's rated breaking strength is specified by the American Society for Testing and Materials (ASTM) based on conductor material, type, and stranding. This breaking strength calculation is a function of the minimum average tensile strength of the component wires (e.g. strands) and rating factors that are based on the number of strand layers. For composite conductors, the rated breaking strength is the sum of the calculated rated breaking strengths for each material. Calculation of the rated strength for an ACSR conductor may be performed as demonstrated in the following examples, the rated strength being equal to the result of a formula:

$$(n_{con}*STR_{con}*RF_{con})+(n_{core}*STR_{core}*RF_{core});$$

wherein $n_{con}$ is the number of conductor strands in the plurality of conductor strands; $n_{core}$ is the number of conductor strands in the conductor core; $STR_{con}$ is the average breaking strength of the conductor strands in the plurality of conductor strands at the core elongation; $STR_{core}$ is the average breaking strength of the conductor strands in the conductor core at the core elongation; $RF_{con}$ is a rating factor of the plurality of conductor strands; and $RF_{core}$ is a rating factor of the conductor core, respectively.

Calculating the rated strength for an ACSR conductor may comprise the sum of the strengths of two different materials multiplied by the appropriate stranding factors specified in ASTM. ACSR conductor, with galvanized core strands, may be manufactured in accordance with ASTM Standard B232. The 1350-H19 aluminum strands meet the requirements of ASTM Standard B230 and the galvanized steel core strands meet the requirements of ASTM Standard B498. ASTM Standard B232 defines the rated strength of ACSR conductors as being the aggregate sum of the strengths of the individual aluminum and steel component strands of the overall ACSR conductor. The tensile strength of the individual aluminum strands is the minimum average tensile strengths for the specified strand diameter. Because the 1350-H19 strands elongate to no more than 1% at their "ultimate tensile strength", the accompanied steel strands must be limited to their strength at 1% elongation, when calculating ACSR's composite rated breaking strength. 1350-H19 strands may be limited to a 1% elongation because 1350-H19 strands may break or become otherwise unusable as electrical conductors if stretched beyond a 1% elongation. Consequently, the steel strands in conventional ACSR can stretch (to a higher percentage elongation at the steel strands' ultimate tensile strength) more than the aluminum strands can (at the aluminum strands' ultimate tensile strength.)

For example, a "Drake" conductor's steel strand size has a 0.1360 inch diameter and has a strength at 1% elongation is 180 ksi. This is from ASTM 498 Table 4. From the same table, the same steel strand has an ultimate tensile strength of 200 ksi where it has an elongation of 4%. This higher strength figure for the steel strands is never reached with conventional ACSR because the aluminum strands, which are elongating along with the steel strands, may all have broken before the 4% elongation is reached. In other words, the higher strength value of the steel strands is not utilized because of limitations of the aluminum strands in conventional ACSR. Consistent with embodiments of the invention, a material (e.g. an alloy of aluminum) may be used for the conductor strands that can maintain the conductor strand's strength up to, for example, 4% elongation and not break or otherwise become unusable as conductor strands. Accordingly, with embodiments of the invention, the higher strength of the steel core strands may be available to increase the composite rated breaking strength of conductor 100.

The following is an example that first shows conventional ACSR using 1350-H19 aluminum conductor strands (e.g. wires) with class A steel core strands and then embodiments of the invention using Aluminum Zirconium for the conductor strands. The tensile strength of conventional 795 kcmil-26/7 ACSR "Drake" conductor (26×0.1749-inch 1350-H19 strands and 7×0.1360 inch steel strands) is calculated below. The minimum average tensile strength for a 0.1749-inch diameter 1350-H19 strand is 24.0 ksi. A single strand breaking strength is:

$$\text{Al. Wire Strength} = \frac{\pi}{4}(0.1749)^2(24{,}000) = 576.6 \text{ lbs}$$

The minimum average tensile stress at 1% elongation for a 0.1360-inch diameter Class A galvanized steel strand (e.g. wire) is 180 ksi. The breaking strength of a single steel strand is:

$$\text{St. Wire Strength} = \frac{\pi}{4}(0.1360)^2(180{,}000) = 2.615 \text{ lbs}$$

Accordingly, Drake's rated breaking strength is:

$$\text{Rated Strength}=(26)(576.6 \text{ lbs.})(0.93)+(7)(2{,}615 \text{ lbs.})(0.96)=31{,}515 \text{ lbs.}$$

Rounding the rated breaking strength to three significant places, Rated Strength=31,500 lbs. for conventional 795 kcmil-26/7 ACSR "Drake".

As stated above, 1350-H19 strands may be limited to a 1% elongation because 1350-H19 aluminum strands may break or become otherwise unusable as a conventional ACSR conductor if stretched beyond a 1% elongation. Because 1350-H19 strands' elongation is limited to approximately 1%, the steel core strands' tensile strength must also be limited to the steel's tensile strength at 1% elongation when calculating conventional ACSR's composite rated breaking strength. In other words, because 1350-H19 strands may be limited to 1% elongation, the steel core's strands should have the same limitation because conventional ACSR is a composite of the two materials, high strength (HS) steel and 1350-H19 Aluminum. Consequently, even though the HS steel used for the core may be elongated beyond 1% and have a higher tensile strength at the higher elongations, conventional ACSR core's tensile strength may be limited by the conductor strands when the conductor strands comprise 1350-H19 Aluminum.

Consistent with embodiments of the invention, a material may be used for first conductor layer 105 and second conductor layer 110 that may have an elongation greater than 1% to take better advantage of core 115's tensile strength when core 115 is made, for example, of HS steel. In this way, with embodiments of the invention, conductor 100's composite rated breaking strength may be increased when using a material for first conductor layer 105 and second conductor layer 110 that may have an elongation greater than 1%. For example, a material may be used for first conductor layer 105 and second conductor layer 110 that may have an elongation of between 1% and 7%. In this way, conductor 100 made with first conductor layer 105 and second conductor layer 110 made from a material having an elongation of between 1% and 7%, core 115's elongation limit could be increased to first conductor layer 105's and second conductor layer 110's higher elongation. In this case, core 115 would not have to be limited to the steel's tensile strength at 1%, but could be increased to the steel's tensile strength at the higher elongation (e.g. between 1% and 7%.) Thus an ACSR's composite rated breaking strength may be enhanced consistent with embodiments of the invention.

First conductor layer 105 and second conductor layer 110 may be made of an Aluminum Zirconium alloy. Aluminum Zirconium alloy is an example, and other materials may be used. Because the elongation of Aluminum Zirconium alloy strands (e.g. wires) is approximately 5%, the tensile strength of the steel wire at 4% or 3% elongation (e.g. per Table 4 in ASTM 498) may be used in calculating the composite rated breaking strength of ACSR using Aluminum Zirconium alloy consistent with embodiments of the invention.

The following is an example using Aluminum Zirconium alloy strand (e.g. wire). The tensile strength of 795 kcmil-26/7 ACSR "Drake" conductor (26×0.1749-inch Aluminum Zirconium alloy strands and 7×0.1360 inch steel strands) will be calculated. The minimum average tensile strength for a 0.1749-inch diameter Aluminum Zirconium alloy strand (e.g. any of first conductor layer strands 130 and second conductor layer strands 135) is 23.500 ksi. A single strand breaking strength is:

$$\text{Al. Wire Strength} = \frac{\pi}{4}(0.1749)^2(23.500) = 564.6 \text{ lbs}$$

The minimum average tensile stress at 4% elongation for a 0.1360-inch diameter class A galvanized steel strand (e.g. wire) is 195 ksi (according to ASTM 498 T6 Table 4.) The breaking strength of a single steel strand (i.e. any of outer core strands 125 and center strand 120 comprising core 115) is:

$$\text{St. Wire Strength} = \frac{\pi}{4}(0.1360)^2(195{,}000) = 2832.7 \text{ lbs.}$$

Consequently, consistent with embodiments of the invention, the conductor's rated breaking strength is:

Rated Strength=(26)(564.6 lbs.)(0.93)+(7)(2832.7 lbs.)(0.96)=32,687.9 lbs.

Rounding the rated breaking strength to three significant places, Rated Strength=32,700 lbs. for 795 kcmil-26/7 ACSR "Drake" consistent with embodiments of the invention. As shown above, the Rated Strength for conventional 795 kcmil-26/7 ACSR "Drake" is 31,500 lbs. Accordingly, the Drake ACSR made consistent with embodiments of the invention has a higher rated breaking strength.

Consistent with embodiments of the invention, using a material (e.g. Aluminum Zirconium alloy) for first conductor layer 105 and second conductor layer 110 that may have elongation properties better than 1350-H19 (e.g. an elongation greater than 1%) may take better advantage of core 115's tensile strength when core 115 is made of HS steel. Accordingly, consistent with embodiments of the invention, an ACSR conductor made with the material having the aforementioned better elongation properties may have an enhanced rated breaking strength as compared to conventional ACSR made using, for example, 1350-H19 Aluminum. Consistent with embodiments of the invention, outer core strands 125 and center strand 120 may comprising core 115 may comprise HS 285 steel strands.

As illustrated above, elongation may mean how much core strands or conductor strands can be stretched and still allow the core strands or conductor strands to be used in an electrical conductor, for example, an ACSR conductor. With conventional ACSR conductors, the composite rated breaking strength of conventional ACSR conductors is limited by the elongation of the conventional conductor strands and not by the elongation of the conventional core strands. Consistent with embodiments of the invention, a material may be used for the conductor strands that has an elongation that is greater than the elongation of conventional conductor strands. In this way, the composite rated breaking strength of an electrical conductor, consistent with embodiments of the invention, may not be limited by the elongation of the conductor strands and may now be more of a function of the elongation of the core strands.

As stated above, consistent with embodiments of the invention, first conductor layer 105 may comprise first conductor layer strands 130. Second conductor layer 110 may comprise second conductor layer strands 135. First conductor layer strands 130 and second conductor layer strands 135 may be considered conductor strands. Center strand 120 and outer core strands 125 may be considered core strands. The core strands, for example, may comprise, but are not limited to, high strength steel, high strength steel meeting ASTM Standard B232, high strength steel 285 steel, or Class A galvanized steel. Consistent with embodiments of the invention, the conductor strands may have an elongation greater than or equal to an elongation of the core strands. For example, the conductor strands may comprise, but are not limited to, Aluminum Zirconium alloy. Notwithstanding, the conductor strands may comprise a material with an elongation that is greater than an elongation of 1350-H19 aluminum strands meeting ASTM Standard B230.

While certain embodiments of the invention have been described, other embodiments may exist. Further, the disclosed methods' stages may be modified in any manner, including by reordering stages and/or inserting or deleting stages, without departing from the invention. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method comprising:

manufacturing a conductor comprising a conductor core and a plurality of conductor strands, the conductor core comprising a plurality of core strands and a core elongation at an ultimate tensile strength of the conductor core, wherein manufacturing the conductor comprises[:]:

providing the conductor core comprising a first material, and stranding the plurality of conductor strands around the conductor core, the plurality of conductor strands comprising a second material, wherein an elongation of the plurality of conductor strands is one of the following: greater than the core elongation and equal to the core elongation, the second material configured to cause the plurality of conductor strands not to break at the elongation of the plurality of conductor strands; and rating the manufactured conductor with a composite rated breaking strength equal to as calculated by an equation:

the composite rated breaking strength= $(n_{con}*STR_{con}*RF_{con})+(n_{core}*STR_{core}*RF_{core})$;

wherein:

$n_{con}$ is a number of conductor strands in the plurality of conductor strands;

$n_{core}$ is a number of core strands in the plurality of core strands;

$STR_{con}$ is an average breaking strength of the conductor strands in the plurality of conductor strands at the core elongation;

$STR_{core}$ is an average breaking strength of the core strands in the plurality of core strands at the core elongation;

$RF_{con}$ is a rating factor of the plurality of conductor strands; and $RF_{core}$ is a rating factor of the plurality of core strands.

2. The method of claim 1, wherein providing the conductor core comprises providing the conductor core wherein the core elongation is between 1% and 4% inclusively.

3. The method of claim 1, wherein providing the conductor core comprising the first material comprises providing the conductor core comprising the first material comprising high strength steel.

4. The method of claim 1, wherein providing the conductor core comprising the first material comprises providing the conductor core comprising the first material comprising high strength (HS) 285 steel.

5. The method of claim 1, wherein providing the conductor core comprising the first material comprises providing the conductor core comprising the first material comprising Class A galvanized steel.

6. The method of claim 1, wherein stranding the plurality of conductor strands around the conductor core comprises stranding the plurality of conductor strands around the conductor core wherein the elongation of the plurality of conductor strands is less than 7%.

7. The method of claim 1, wherein stranding the plurality of conductor strands around the conductor core comprises stranding the plurality of conductor strands around the conductor core wherein the elongation of the plurality of conductor strands is less than 4%.

8. The method of claim 1, wherein stranding the plurality of conductor strands around the conductor core, the plurality of conductor strands comprising the second material comprises stranding the plurality of conductor strands around the conductor core, the plurality of conductor strands comprising the second material wherein the second material comprises Aluminum Zirconium alloy.

9. The method of claim 1, wherein stranding the plurality of conductor strands around the conductor core comprises stranding the plurality of conductor strands around the conductor core wherein each of the plurality of conductor strands has a trapezoidal cross-sectional shape.

10. The method of claim 1, wherein stranding the plurality of conductor strands around the conductor core comprises stranding the plurality of conductor strands around the conductor core wherein each of the plurality of conductor strands are compacted.

11. The method of claim 1, wherein providing the conductor core comprises providing the conductor core having the plurality of core strands wherein the plurality of core strands comprise a center strand with a plurality of outer core strands helical wrapped around the center strand.

12. The method of claim 1, wherein stranding the plurality of conductor strands around the conductor core comprises stranding the plurality of conductor strands around the conductor core wherein the plurality of conductor strands comprise a second conductor layer helical wrapped around a first conductor layer.

13. The method of claim 12, wherein stranding the plurality of conductor strands around the conductor core comprises stranding the plurality of conductor strands around the conductor core wherein the first conductor layer and second conductor layer are wrapped in respective alternating hand lay.

14. The method of claim 1, wherein rating the manufactured conductor comprises rating the manufactured conductor wherein the manufactured conductor comprises aluminum conductor steel reinforced (ACSR).

15. A method comprising:

manufacturing a conductor comprising a conductor core and a plurality of conductor strands, the conductor core comprising a plurality of core strands and a core elongation at an ultimate tensile strength of the conductor core, the conductor having a composite rated breaking strength equal to as calculated by an equation:

$$\text{the composite rated breaking strength} = (n_{con}*STR_{con}*RF_{con})+(n_{core}*STR_{core}*RF_{core});$$

wherein:

$n_{con}$ is a number of conductor strands in the plurality of conductor strands;

$n_{core}$ is a number of core strands in the plurality of core strands;

$STR_{con}$ is an average breaking strength of the conductor strands in the plurality of conductor strands at the core elongation;

$STR_{core}$ is an average breaking strength of the core strands in the plurality of core strands at the core elongation;

$RF_{con}$ is a rating factor of the plurality of conductor strands; and $RF_{core}$ is a rating factor of the plurality of core strands, wherein manufacturing the conductor comprises:

providing the conductor core comprising a first material, and stranding the plurality of conductor strands around the conductor core, the plurality of conductor strands comprising a second material, *wherein* an elongation of the plurality of conductor strands is one of the following: greater than the core elongation and equal to the core elongation, the second material configured to cause the plurality of conductor strands not to break at the elongation of the plurality of conductor strands.

*16. The method of claim 1, wherein:*

*$STR_{con}$ is an average breaking strength equal to the average of a conductor strand breaking strength of each of the plurality of conductor strands; and*

*$STR_{core}$ is an average breaking strength equal to an average of a core strand breaking strength of each of the plurality of core strands;*

*wherein each of the conductor strand breaking strength and the core strand breaking strength is a minimum breaking strength calculated as the product of a minimum average tensile strength and a cross-sectional area for each of the plurality of conductor strands and each of the plurality of core strands, respectively.*

* * * * *